United States Patent [19]

Berger

[11] Patent Number: 4,530,027
[45] Date of Patent: Jul. 16, 1985

[54] POWER FAILURE PROTECTOR CIRCUIT

[75] Inventor: John G. Berger, Elizabethtown, Pa.

[73] Assignee: Sperry Corporation, New York, N.Y.

[21] Appl. No.: 595,187

[22] Filed: Mar. 30, 1984

[51] Int. Cl.³ .............................................. H02H 3/24
[52] U.S. Cl. ...................................... 361/92; 361/89;
307/200 A; 340/663
[58] Field of Search ....................... 361/92, 88, 86, 89;
307/200 A, 200 B; 340/663

[56] References Cited

U.S. PATENT DOCUMENTS

| | | | |
|---|---|---|---|
| 3,383,522 | 5/1968 | Apfelbeck et al. | 340/663 X |
| 3,562,555 | 2/1971 | Ahrons . | |
| 3,657,603 | 4/1972 | Adams . | |
| 3,784,846 | 1/1974 | Krick . | |
| 4,117,526 | 9/1978 | Bates | 340/663 X |

Primary Examiner—Patrick R. Salce
Attorney, Agent, or Firm—Griffin, Branigan, & Butler

[57] ABSTRACT

A power failure protector circuit prevents spurious output signals from an electronic circuit when power to the electronic circuit is interrupted. The output of the electronic circuit is effectively blocked by a switch. The switch is turned off when the power supply is turned on and remains off until the power supply is interrupted. A capacitor is normally charged to the operating voltage of the power supply and when the power supply is interrupted, the capacitor discharges to turn the switch on during the interval when the operating voltages of the electronic circuit are decaying. The capacitor also provides a power source to maintain the operating voltages of the electronic circuit near normal for a short interval after the power supply is interrupted thus insuring correct operation of the electronic circuit until after the switch is turned on and the output from the circuit is blocked.

10 Claims, 2 Drawing Figures

POWER FAILURE PROTECTOR CIRCUIT

BACKGROUND OF THE INVENTION

The present invention relates to a power failure protector circuit for preventing spurious output signals from an electronic circuit when the power supply for the electronic circuit drops below its normal operating level. More particularly, the present invention provides a means for preventing spurious output signals from an electronic circuit when its power supply is turned off or drops below some predetermined level required for proper operation of the circuit.

Electronic circuits with active circuit elements such as transistors and vacuum tubes may produce spurious output signals when the power supply which provides the bias voltages for the active elements is below its normal operating range. The spurious output signals may occur when the power supply is interrupted, the term interrupted being used herein to collectively define normal turn-off or an abnormal condition which results in either a drop of the power supply voltage below its normal operating range or an intermittent or permanent loss of power.

Power supply interruptions occur frequently in some environments. For example, in farm machinery such as combine harvesters, electronic circuits are used for various control purposes and these circuits are frequently located up to 25 feet from the power supply, the connection being made through circuits which may include multiple cable connectors and relay contacts. The circuit connections through the cable connectors and relay contacts are not always reliable and are sometimes intermittent. Furthermore, the power supply is frequently the battery used in the ignition system for the combine harvester and its output voltage may drop when the engine is started or restarted. All of these factors cause variations in the bias voltages supplied to the active elements within the electronic circuits and, as is well known, such variations in the bias voltages may cause unreliable operation of the individual active elements in the circuits thereby resulting in spurious or unwanted output signals from the circuits.

SUMMARY OF THE INVENTION

An object of the present invention is to provide a simple and inexpensive protector circuit for preventing spurious output signals from an electronic circuit when the power supply output to the electronic circuit is not above a minimum operating level.

An object of the present invention is to provide a protector circuit, responsive to the output of a power supply, for blocking the output from an electronic circuit whose operating voltages are derived from the power supply, the blockage being for a short interval after the output of the power supply is interrupted.

In accordance with the principles of the present invention a filter capacitor is connected to be charged from a power supply and discharged into an electronic circuit when the power supply is interrupted. The electronic circuit drives an output device. A first transistor is connected to switch any output from the electronic circuit away from the output device when the transistor is on, the first transistor being connected to the capacitor and a second transistor. The second transistor is connected to the power supply and is turned on when the power supply is turned on. When the second transistor is on it blocks the first transistor so that output signals from the electronic circuit are applied to the output device. When the power supply voltage drops below some predetermined minimum operating level, the second transistor immediately turns off. The capacitor discharges into the electronic circuit to maintain normal or near-normal operating voltage levels for a short interval. The capacitor also discharges into the first transistor, thereby turning it on and switching any output signals from the electronic circuit away from the output device. The first transistor is maintained in the conducting state until after the voltages in the electronic circuit have decayed below any level which could result in an output signal from the electronic circuit. In a described preferred embodiment the electronic circuit is a transistorized stone detector circuit such as might be found on combine harvesters.

DETAILED DESCRIPTION OF THE INVENTION

Figure 1:
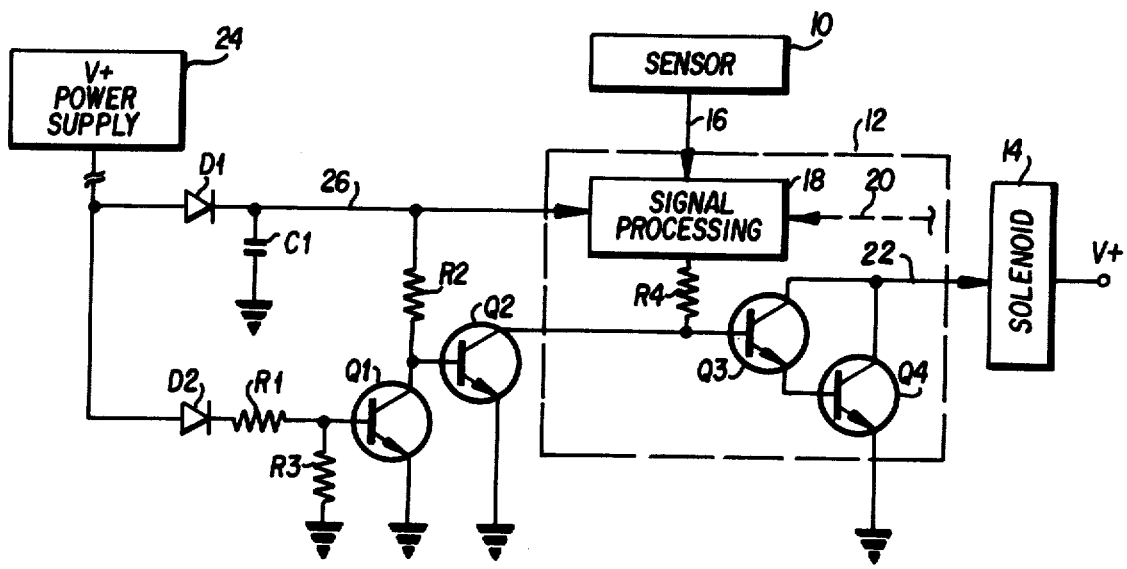
FIG. 1 comprises a schematic circuit diagram showing the protector circuit of the present invention connected to prevent spurious output signals from an electronic stone detector.
Figure 2:
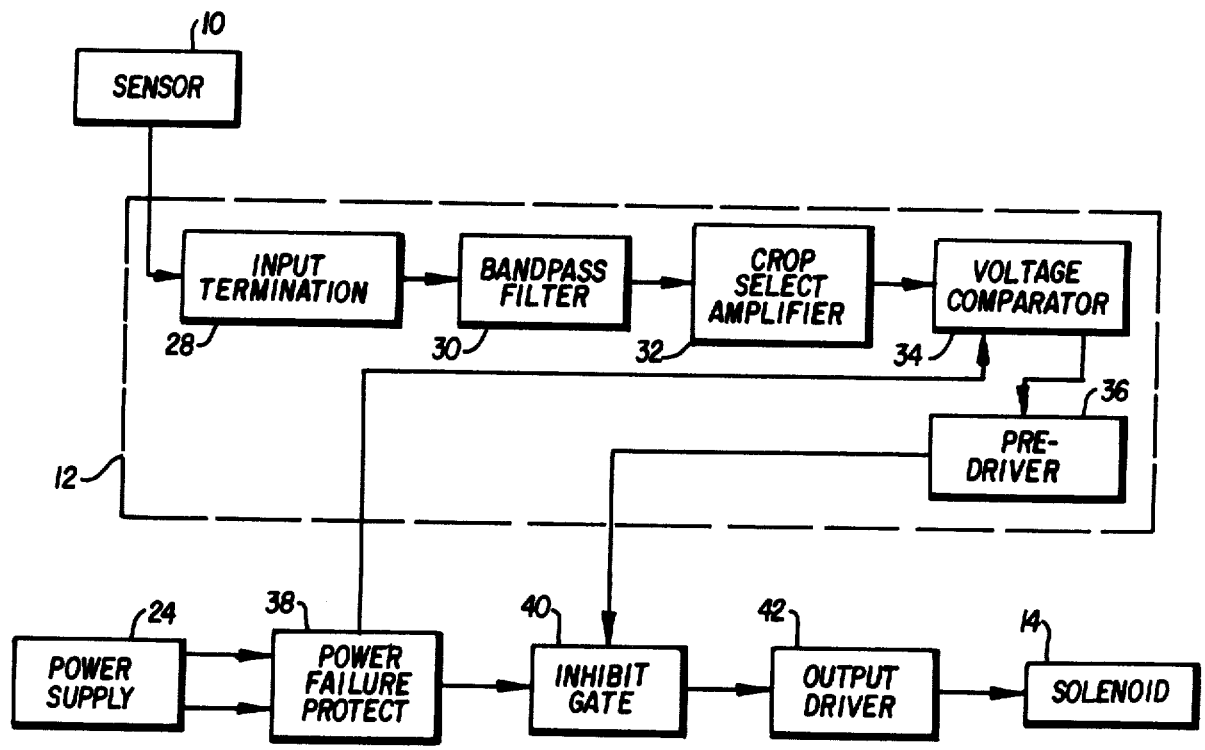
FIG. 2 illustrates a prior art stone detector circuit in combination with the present invention.

FIG. 1 illustrates the use of the present invention as a protector circuit for an electronic stone detector system such as might be used on a combine harvester. The stone detector system, per se, is well known. Generally speaking, the stone detector system comprises a sensor means 10, a signal processor 12 and an output device illustrated as a solenoid 14. The sensor means 10 produces an electrical output signal over a lead 16 to the signal processor 12 when a stone is detected. The signal processor 12 includes an electronic signal processing circuit 18 which may take any form and may logically operate on one or more signals applied to electronic circuit 18 over one or more leads 20. However, if the signal processor circuit is a stone detector circuit for a combine harvester it may merely include an input termination 28, a bandpass filter 30, a crop select amplifier 32, a voltage comparator 34 and a pre-driver 36 as illustrated in FIG. 2. The sensor is mounted on a sensor plate to detect the presence of a stone in the feeder portion of a combine harvester. The amplifier 32 is adjustable so that "noise", such as that produced by ears of corn, will not produce an output signal large enough to trigger the comparator 34 which compares the output of amplifier 32 with a reference voltage derived through the power failure protector circuit 38. In FIG. 2, the output driver 42 corresponds to transistors Q3 and Q4 of FIG. 1, the inhibit gate 40 corresponds to transistor Q2 and the power failure protector circuit 38 corresponds to transistor Q1, diodes D1 and D2, capacitor C1, and resistors R1-R3.

Returning to FIG. 1, electronic circuit 18 may intermittently produce an output signal which is applied through a resistor R4 to the base of a transistor Q3. The emitter of transistor Q3 is connected to the base of a transistor Q4 and the collectors of the two transistors are connected together. The emitter of transistor Q4 is grounded. The collectors of transistors Q3 and Q4 are connected by a lead 22 to the solenoid 14. This solenoid operates a trap door (not shown) which is opened to permit a detected stone to fall from the combine harvester. Thus, when sensor 10 senses a stone in the feeder of the combine harvester it produces a signal which is processed by electronic circuit 18. Circuit 18 produces an output signal to turn on Q3 and Q4 thereby operating solenoid 14 and opening the trap door so that the stone may fall from the feeder to the ground.

The signal processor 12 is powered by a power supply 24 which provides a suitable DC voltage for operating the transistor circuits in the processor. In a combine harvester the power supply may be the battery which provides electrical power at +12 V to the harvester ignition system. The power supply is connected through a diode D1 and by a lead 26 to electronic circuit 18 and a capacitor C1 is connected at one side to ground at the other side to lead 26.

Diode D1 and capacitor C1 act as a filter to filter out fluctuations in the voltage supplied by power supply 24 such as may be caused, for example, by operation of other electrical devices (not shown) powered by the power supply. The capacitor C1 is normally charged to the voltage level of the power supply. When the output voltage of the power supply drops, capacitor C1 discharges into the electronic circuit 18 thereby maintaining the bias voltages for the transistors contained therein. Diode D1 blocks the discharge of C1 into the power supply 24 during intervals when the power supply voltage drops.

The capacitor C1 is able to maintain the voltage on lead 26 at the desired level for only a short interval after the voltage of the power supply drops below its normal operating value. The capacitor C1 discharges and as it discharges the voltage on lead 26 falls to whatever voltage level is provided at the output of power supply 24. Thus, if the output voltage from the power supply drops below some predetermined level and remains there for an interval long enough to discharge capacitor C1 significantly below that level, the bias voltages for the various transistors in the electronic signal processing circuit 18 will drop below normal and the signal processing circuit may erroneously produce an output signal through R4 to operate solenoid 14. A similar situation may occur when the power supply is turned off, that is, when the ignition switch (not shown) on the harvester is turned off to disconnect the battery.

To prevent any spurious output signal produced by the electronic signal processing circuit 18 from operating the solenoid 14, the present invention provides a diode D2, three resistors R1, R2 and R3, and first and second switch means illustrated as transistors Q1 and Q2. The diode D2 and resistor R1 are connected in series between power supply 24 and the base of transistor Q1. Resistor R3 is connected at one side to ground and at the other side to the function of resistors R1 and the base of transistor Q1. Resistors R1 and R3 form a voltage divider which provides, at the base of transistor Q1 a voltage sufficient to cause Q1 to conduct as long as the power supply voltage is at, or quite near, its normal level of +12 V. The collector of transistor Q1 is connected to the base of transistor Q2 and the collector of Q2 is connected to the base of transistor Q3. The emitters of transistors Q1 and Q2 are connected to ground and a resistor R2 is connected between the lead 26 and the base of transistor Q2.

Generally speaking, transistor Q2 acts as a gate or switch means for selectively diverting any output signal from the electronic current processing circuit 18 to ground and away from transistor Q3 while transistor Q1 acts to prevent transistor Q2 from conducting as long as the output voltage from the power supply is at, or quite near, its normal operating value of +12 V.

As long as the voltage output of the power supply is at +12 V, transistor Q1 conducts thereby diverting any current through R2 to ground. This holds transistor Q2 off so that any current signals from electronic circuit 18 may pass through R4 and Q3 to turn on Q3 and Q4 thereby activating solenoid 14.

When the output of the power supply drops below +12 V for any reason including normal turn off, failure or overload, transistor Q1 immediately turns off. Capacitor C1 begins discharging into electronic signal processing circuit 18 to maintain for a short interval the bias voltages for the transistors in circuit 18. C1 also discharges through R2 and, since Q1 is off, the discharge current from C1 passes through the base of Q2 to ground and Q2 is turned on. With transistor Q2 on, any current flowing through R4 passes through transistor Q2 to ground and is diverted from transistor Q3 so that it cannot be turned on to activate solenoid 14. As long as there is any significant discharge current from C1, transistor Q2 remains on thereby diverting any output current from signal processing circuit 18 away from transistor Q3 while the bias voltages therein decay to zero.

While a preferred embodiment of the invention has been described for particular use as a protector circuit for a stone detector system it is readily apparent that the invention may be used in numerous environments where it is desirable to block the output of an electronic circuit to prevent spurious output signals when the power supply fails or is cut off. Thus, electronic circuit 18 may be any form of electronic circuit having active circuit elements such as transistors or vacuum tubes and the output device 14 may be any form of electrically operated device. Furthermore, it will be obvious that the specific voltage values and circuit configuration shown for the purpose of illustrating the invention may be modified without departing from the spirit and scope of the invention as defined by the appended claims, it being well known that PNP transistors may be substituted for NPN transistors if proper voltage polarities are maintained.

The embodiments of the invention in which an exlusive property or privilege is claimed are defined as follows:

1. In a system wherein an electronic circuit produces output signals to drive an output device, said electronic circuit being powered by a power supply, the improvement comprising a protector circuit for preventing output signals from said electronic circuit from driving said output device during intervals when the output voltage of said power supply drops below a predetermined level, said improvement comprising:

a capacitor connected to be charged by said power supply output voltage, said capacitor discharging into said electronic circuit when said power supply output voltage drops;

first and second switch means each having a conducting and a non-conducting state;

means connecting said first switch means to said power supply to maintain said first switch means in a conducting state only as long as the output voltage from said power supply is at or near its normal operating level;

means connecting said first switch means to said second switch means to maintain said second switch means in a non-conducting state as long as said first switch means is conducting;

means connecting said second switch means intermediate said electronic circuit and said output device to thereby switch any output signal from said electronic circuit away from said output device as long as said second switch is in its conducting state; and, means connecting said capacitor to said second switch means whereby the discharge of said capacitor may switch said second switch means to its conducting state and maintain said second switch means in said conducting state for an interval of time after the voltage output of said power supply drops below its normal operating level and said first switch means switches to its non-conducting state, whereby said capacitor provides power to said electronic circuit and said second switch means switches output signals away from said output device when said power supply voltage drops below said predetermined level.

2. The improvement as claimed in claim 1 wherein said first and second switches comprise first and second transistors, respectively.

3. The improvement as claimed in claim 2 wherein said capacitor discharge maintains said second transistor in its conducting state until after the discharge of said capacitor into said electronic circuit is no longer sufficient to permit said electronic circuit to produce an output signal.

4. The improvement as claimed in claim 3 wherein said electronic circuit comprises a signal processing circuit in a combine harvester stone detector.

5. The improvement as claimed in claim 4 wherein said output device is an actuator for opening a trap door on said combine harvester.

6. The improvement as claimed in claim 1 in combination with a sensor means for sensing the presence of a stone in said combine harvester, said sensor means producing output signals to said electronic circuit.

7. The improvement as claimed in claim 2 including a blocking diode connected between said power supply and said capacitor.

8. The improvement as claimed in claim 7 wherein said means connecting said first switch means to said power supply comprises a voltage divider means providing an output signal to bias said first transistor.

9. In a system having power supply means for supplying power at some predetermined voltage, an electronic signal processing circuit responsive to input signals for producing output signals, and output means responsive to said output signals for performing a desired function, said power supply means being connected to said electronic signal processing circuit to provide operating voltages for active electronic components therein, the improvement comprising:

capacitor means connected to said power supply means and said signal processing circuit whereby said capacitor is chargeable by said power supply to said predetermined voltage and is dischargeable into said signal processing circuit to provide said operating voltages when the voltage produced by said power supply drops; and, switch means connected to said capacitor means and said power supply means for switching output signals produced by said electronic signal processing circuit away from said output means for an interval of time following interruption of said predetermined voltage, said capacitor controlling said switch means to switch said output signals for an interval of time longer than it takes said capacitor to discharge to a level such that the operating voltages supplied to said active electronic components are no longer capable of causing an output signal from said electronic signal processing circuit.

10. The improvement as claimed in claim 9 wherein said switch means comprises first and second transistors, said first transistor being responsive to said power supply to block operation of said second transistor as long as said power supply means produces said predetermined voltage, said second transistor being connected to said capacitor means whereby the discharge of said capacitor means maintains said second transistor conductive, said second transistor being connected to said signal processing circuit for diverting any output signal therefrom away from said output means.

* * * * *